(12) United States Patent
Hammad

(10) Patent No.: US 9,676,506 B2
(45) Date of Patent: Jun. 13, 2017

(54) VACUUM PACKAGING AND SEALING APPLIANCE WITH LIQUID DETECTION

(71) Applicant: Sunbeam Products, Inc., Boca Raton, FL (US)

(72) Inventor: Jamal F. Hammad, Boynton Beach, FL (US)

( * ) Notice: Subject to any disclaimer, the term of this patent is extended or adjusted under 35 U.S.C. 154(b) by 783 days.

(21) Appl. No.: 14/058,560

(22) Filed: Oct. 21, 2013

(65) Prior Publication Data

US 2014/0109511 A1    Apr. 24, 2014

Related U.S. Application Data

(63) Continuation of application No. 13/702,135, filed on Dec. 5, 2012, now Pat. No. 9,352,864.

(60) Provisional application No. 61/716,105, filed on Oct. 19, 2012.

(51) Int. Cl.
    *B65B 31/04* (2006.01)
    *B29C 65/00* (2006.01)
    *B65B 57/00* (2006.01)

(52) U.S. Cl.
    CPC .......... *B65B 31/04* (2013.01); *B29C 66/8324* (2013.01); *B65B 31/046* (2013.01); *B65B 31/048* (2013.01); *B65B 57/00* (2013.01)

(58) Field of Classification Search
    CPC ....... B65B 31/00; B65B 31/04; B65B 31/046; B65B 31/048; B65B 31/02; B65B 31/024; B29C 66/8324
    USPC ... 53/510, 512, 432, 434, 403, 79, 405, 408, 53/88; 73/29.01–29.05
    See application file for complete search history.

(56) References Cited

U.S. PATENT DOCUMENTS

| | | | | |
|---|---|---|---|---|
| 4,592,192 A * | 6/1986 | Jacob | .................... | B30B 9/3046 53/298 |
| 5,655,357 A * | 8/1997 | Kristen | ................. | B65B 31/046 53/512 |
| 5,794,408 A * | 8/1998 | Patouraux | ............... | B32B 15/08 53/432 |
| 7,021,027 B2 * | 4/2006 | Higer | .................... | B65B 31/046 53/434 |
| 7,401,452 B2 * | 7/2008 | Kahn | .................... | B65B 31/046 53/374.9 |

(Continued)

FOREIGN PATENT DOCUMENTS

CN            101915636        12/2010

*Primary Examiner* — Stephen F Gerrity
*Assistant Examiner* — Joshua Kotis
(74) *Attorney, Agent, or Firm* — Sunbeam Products, Inc.

(57) ABSTRACT

A vacuum sealing appliance is provided including a vacuum motor assembly generating suction, a vacuum trough fluidly connected to the vacuum motor assembly configured to receive suction and evacuate a food container through an open end, and at least one heat sealing element adjacent the vacuum trough configured to heat seal the open end of the food container after evacuation. The vacuum sealing appliance further includes a control unit configured to control the vacuum motor assembly and the at least one heat sealing element. The vacuum sealing appliance further includes a sensor electrically connected to the control unit configured to detect moisture in exhaust air of the vacuum motor assembly and send electrical signals to the control unit. Based upon the electrical signals, the control unit controls one or both of the vacuum motor assembly and the at least one heat sealing element.

17 Claims, 5 Drawing Sheets

(56) References Cited

U.S. PATENT DOCUMENTS

| | | | | |
|---|---|---|---|---|
| 2002/0078661 A1* | 6/2002 | Bowden | B65B 11/025 | 53/397 |
| 2003/0046907 A1* | 3/2003 | Costello | B65B 31/024 | 53/512 |
| 2004/0101438 A1* | 5/2004 | Nelson | B65B 55/10 | 422/31 |
| 2005/0022474 A1* | 2/2005 | Albritton | B65B 31/046 | 53/434 |
| 2005/0039420 A1* | 2/2005 | Albritton | B65B 31/046 | 53/432 |
| 2008/0308177 A1* | 12/2008 | Thuot | B65B 31/04 | 141/65 |
| 2009/0044497 A1* | 2/2009 | Falat | B65B 5/024 | 53/478 |
| 2009/0293430 A1* | 12/2009 | Iocco | B65B 31/024 | 53/434 |
| 2011/0114519 A1* | 5/2011 | Narendrnath | H01L 21/6831 | 206/349 |
| 2013/0180210 A1* | 7/2013 | Hammad | B65B 31/024 | 53/405 |
| 2014/0041336 A1* | 2/2014 | Lee | B65B 57/00 | 53/52 |

* cited by examiner

VACUUM PACKAGING AND SEALING APPLIANCE WITH LIQUID DETECTION

FIELD OF THE INVENTION

The present invention generally relates to a vacuum packaging and sealing appliance. More specifically, the present invention relates to a vacuum packaging and sealing appliance for food storage containers utilizing a humidity sensor in the exhaust of the vacuum pump to detect the presence of liquid drawn into the vacuum trough during vacuum sealing.

BACKGROUND OF THE INVENTION

Various appliances and methods are used for the purpose of vacuum packaging and sealing plastic bags and containers to protect perishables, such as foodstuffs, and other products against oxidation. Typically, these vacuum and sealing appliances use a heat sealing element to form a seal at the open end of the container being sealed. The container may even be evacuated of excess moisture and air through the use of a vacuum pump prior to heat sealing to minimize the spoiling effects of oxygen on food. However, excess food and moisture that was not fully evacuated in proximity to the seal area on the storage container may inhibit sealing and lead to poor seal quality. Further, using two heat sealing elements to form two seals adjacent one another in proximity to the open end of the container still suffer from the drawback that excess food and moisture not evacuated in the seal area inhibits proper sealing. Thus, the need exists for improved machine sealing of a food storage container in the proximity of the seal area adjacent the open end of the container where excess food and moisture inhibits proper machine sealing.

SUMMARY OF THE INVENTION

In an embodiment, there is provided a vacuum sealing appliance including a vacuum motor assembly generating suction, a vacuum trough fluidly connected to the vacuum motor assembly configured to receive suction and evacuate a food container through an open end and at least one heat sealing element adjacent the vacuum trough configured to heat seal the open end of the food container after evacuation. The vacuum sealing appliance further includes a control unit configured to control the vacuum motor assembly and the at least one heat sealing element. The vacuum sealing appliance further includes a sensor electrically connected to the control unit configured to detect moisture in exhaust air of the vacuum motor assembly and send electrical signals to the control unit. Based upon the electrical signals, the control unit controls one or both of the vacuum motor assembly and the at least one heat sealing element.

In an embodiment, there is provided a vacuum packaging device for evacuating and sealing one or more open ends of a flexible container for storing perishable items. The vacuum packaging device includes a vacuum motor assembly generating suction, a vacuum trough fluidly connected to the vacuum motor assembly configured to receive suction and evacuate the flexible container through one of the open ends, and at least one heat sealing element adjacent the vacuum trough configured to heat seal one of the open ends of the food container after evacuation. The vacuum packaging device further includes a processor configured to control the vacuum motor assembly and the at least one heat sealing element. The vacuum packaging device further includes a humidity sensor electrically connected to the control unit configured to detect humidity in exhaust air of the vacuum motor assembly and send electrical signals to the control unit. Based upon the electrical signals, the control unit controls one or both of the vacuum motor assembly and the at least one heat sealing element.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
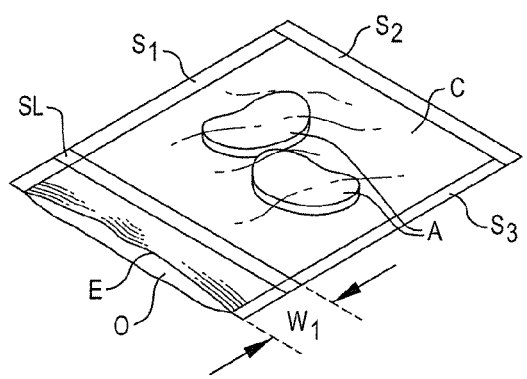
FIG. 1 is a prior art container C having a single machine seal SL a distance W from a top edge E of the container C.

Referring now to the drawing figures in which like reference designators refer to like elements, there is illustrated in FIG. 1 a prior art container C made from two layers of transparent film or other films known to one of ordinary skill in the art. The container C may be pre-sealed at the factory along three edges by sealing the two layers together with seals $S_1$, $S_2$ and $S_3$. A remaining edge E may form an open end or opening O where items A to be sealed in the container C may be inserted. After the items A have been inserted through the opening O, a known vacuum sealing appliance may seal the opening O at a distance $W_1$ from the edge E by heat sealing or other means by forming a single machine seal SL. It is typical in current vacuum sealing machines of this type that the distance $W_1$ is in the twenty-five to thirty-eight millimeter range and the width of the machine seal SL is in the two to five millimeter range.

Figure 2:
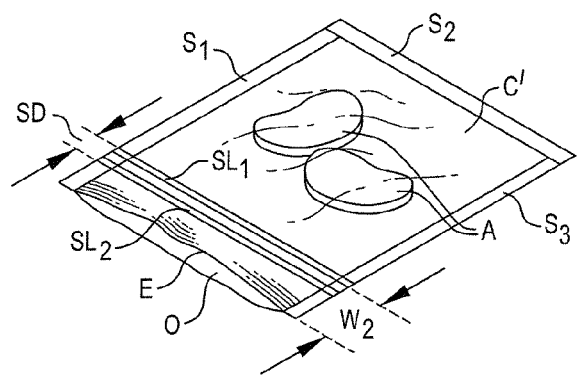
FIG. 2 is an embodiment of a container C' with a first seal $SL_1$ a predetermined distance from a top edge E of the container C' and a second seal $SL_2$ another predetermined distance from the first seal $SL_1$ and disposed between the first seal $SL_1$ and the top edge E of the container C'.

Referring now to FIG. 2, there is illustrated a partially formed flexible container C' that is utilized in the subject vacuum sealing appliance 100 described hereinbelow. The container C' may be pre-sealed along three edges at the factory by sealing the two layers together with seals $S_1$, $S_2$ and $S_3$. A remaining edge E may form an open end or opening O where items A to be sealed in the container C' may be inserted. In another embodiment, only two lateral edges may be pre-sealed with seals $S_1$ and $S_3$ at the factory and the remaining edges may be sealed by the vacuum sealing appliance 100 as described below. As such, the container C' may be formed from a roll of container material where a section of the bag material is cut from the roll and the two open ends are then sealed to form a hermetically sealed container C'. First, one of the open ends is sealed using the vacuum sealing appliance 100 to form a seal $S_2$. Next, after the items A have been inserted through the opening O, the vacuum sealing appliance 100 may seal the opening O at a predetermined distance $W_2$ (typically in the twenty-five to thirty-eight millimeter range) from the edge E by heat sealing at a predetermined temperature for a predetermined time to form a first machine seal $SL_1$. The area of the container C' disposed in the predetermined distance $W_2$ between the first seal $SL_1$ and the open end E is commonly known as the after seal area on such containers C' and its importance herein will be discussed in further detail below.

After a predetermined time has elapsed since the first machine seal $SL_1$ was formed, the vacuum sealing appliance 100 may form a second machine seal $SL_2$ a predetermined distance SD (typically in a range of two to three millimeters) from the first machine seal $SL_1$ and between the edge E and the first machine seal $SL_1$. The second seal $SL_2$ may be formed after a predetermined dwell period D between when the first seal $SL_1$ was formed to allow any liquids that may be between the film layers in the after seal area to be removed. It has been found that such liquid in the proximity of the first machine seal $SL_1$ during sealing may cause first seal $SL_1$ to seal poorly. As a precaution, after the heat sealing of first seal $SL_1$ is completed and the predetermined dwell time D has elapsed to evacuate any additional food or liquids in the after seal area $W_2$, the second seal $SL_2$ may be formed to ensure the integrity of the sealing of the opening O. In addition, the second seal $SL_2$ may be formed at a predetermined temperature higher than the predetermined temperature $SL_1$ was formed at and for a longer predetermined heat sealing time. The higher predetermined temperature and longer predetermined heat sealing time ensure a higher integrity seal of the second seal $SL_2$ as compared to the first seal $SL_1$. The width of the first and second seals $SL_1$ and $SL_2$ may be in the 2-3 millimeter range.

Figure 3:
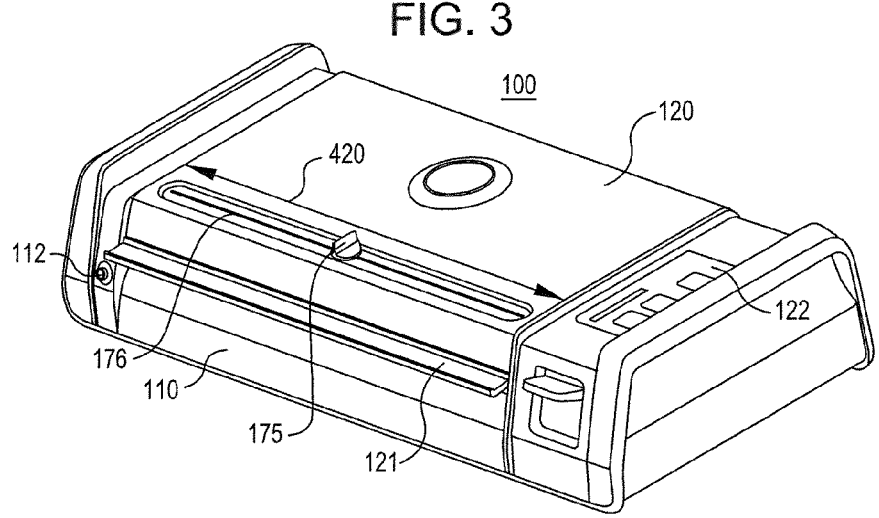
FIG. 3 is a perspective view of an embodiment of a vacuum packaging and sealing appliance.
Figure 4:
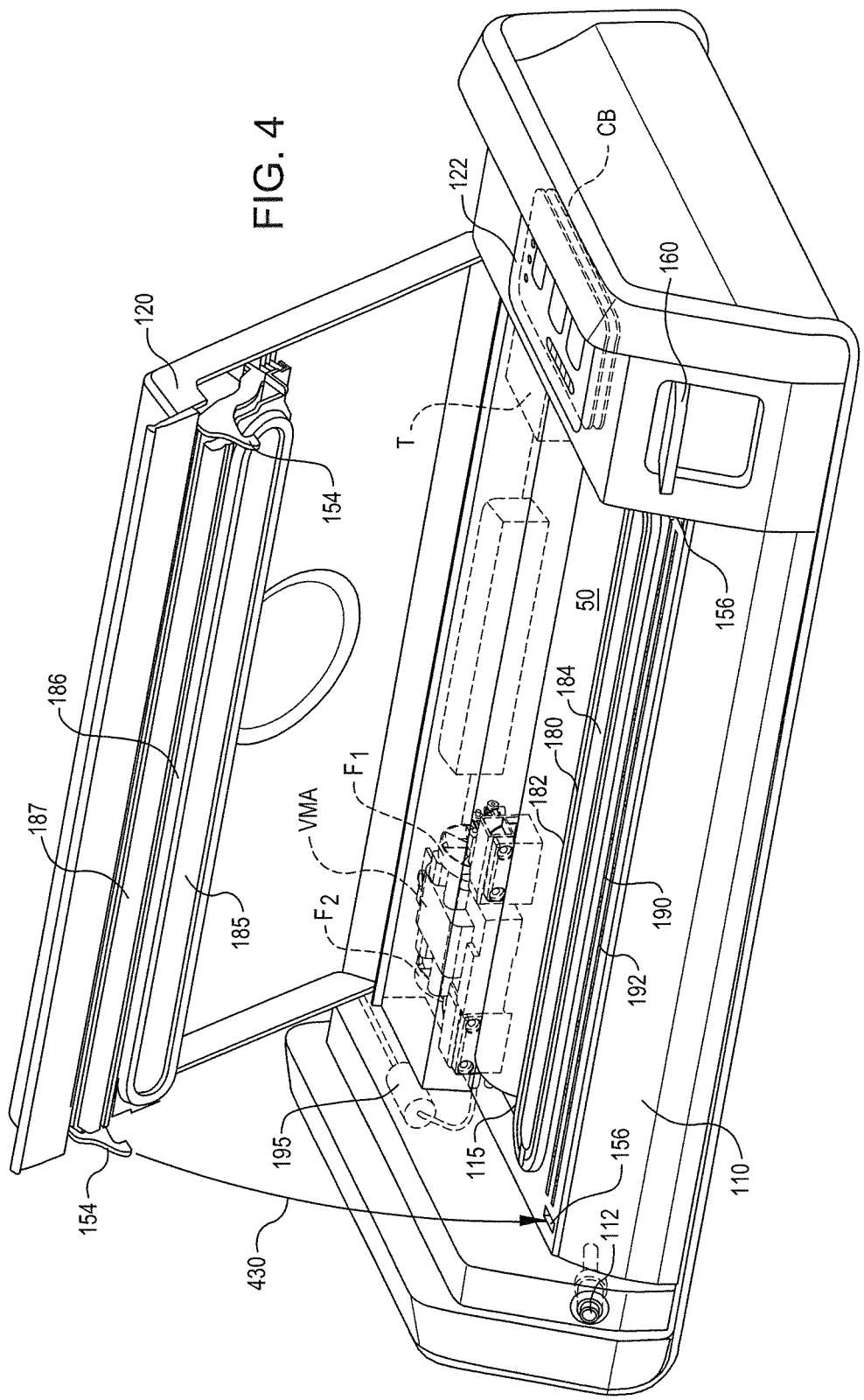
FIG. 4 is a perspective view of an embodiment of the vacuum packaging and sealing appliance of FIG. 3 with the lid in an open configuration.

Referring now to FIGS. 3 and 4, there is illustrated an exemplary embodiment of a vacuum sealing appliance 100 for dispensing, evacuating and sealing a container C' as illustrated in FIG. 2 with a double seal $SL_1$, $SL_2$. The vacuum sealing appliance 100 may include a storage compartment 115 for a roll 50 of flexible container material that is pre-sealed on two sides with seals $S_1$ and $S_3$. A pivoting lid 120 encloses the storage compartment 115 in the closed position illustrated in FIG. 3, and oppositely, allows a section of container material to be dispensed from the roll 50 in the open position illustrated in FIG. 4. The section of container material is cut from the roll 50 with the lid 120 pivoted back to the closed position in FIG. 3 using a cutting device 175 fitted into a track 176 formed in the lid 120. The remaining open ends of the section of container material may then be sealed using the vacuum sealing appliance 100 forming seal $S_2$ and seals $SL_1$ and $SL_2$. Alternately, a container C' (FIG. 2) pre-sealed at the factory on three sides with seals $S_1$, $S_2$ and $S_3$ may be used. The remaining open end O may be sealed using the vacuum sealing appliance 100 forming the seals $SL_1$ and $SL_2$.

In the illustrated embodiment, the flexible container material is a roll 50 of flattened, tubular container material and is stored in the compartment 115 without support mechanisms and is free to rotate therein. In another embodiment, the roll 50 of container material is stored in the compartment 115 with support mechanisms (not shown) and is free to rotate therein. In another embodiment, the storage compartment 115 is eliminated and sections of flexible container material from another source are evacuated and/or sealed using the vacuum sealing appliance 100.

In an embodiment, the cutting device 175 is disposed in a track 176 formed in the lid 120. In order to cut a section of container material from the roll 50, a section of container material is pulled from the roll 50 such that the desired location where the bag material to be cut is disposed directly beneath the cutting device 175 and track 176. The lid 120 is then closed and the user then preferably slides the cutting device 175 back and forth along the track 176 in the direction of arrow 420, whereby the cutting device 175 cuts the container material to provide the user with a partially formed container C'. It should be noted that the cutting device 175 is able to be moved in a direction from left to right as well as right to left along the track 176 to cut the flexible container material. Alternately, the user does not dispense the flexible container material from the compartment 115 and/or does not cut the flexible container material using the cutting device 175.

After dispensing and cutting a section of container material, one of the open ends of the section of container material may be sealed using the vacuum sealing appliance 100 such as by heat sealing. Food items A may then be placed inside the partially formed container C' followed by the partially formed container C' being evacuated, and then the remaining open end O may be heat sealed as described below to form a hermetically sealed container C' that retains the freshness of the food items A therein.

In the exemplary embodiment, the vacuum sealing appliance 100 includes a base 110 with the storage compartment 115 formed therein and the lid 120. The lid 120 is hingedly connected to the rear portion of the base 110 for enclosing the compartment 115 and a lower vacuum trough 180. The roll storage compartment 115 is disposed behind the lower vacuum trough 180. An upper vacuum trough 185 and gasket 186 are disposed on the lid 120 and mate against the lower vacuum trough 180 and a gasket 182 when the lid 120 is in the closed position to form a composite sealed vacuum chamber. A lip 121 is disposed on the front edge of the lid 120 allowing the user to grasp the lid 120 when moving the lid between the open and closed positions.

A latch bar 160 is disposed on the exterior of the base 110 which may be depressed to lock the lid 120 into the closed position. A pair of latches 154, 154 on either side of the upper vacuum trough 185 are inserted into respective slots 156, 156 on either side of a pair of heat sealing elements 190, 192 when the lid 120 is pivoted in the direction of arrow 430 into the closed position. The latches 154, 154 each include a hook that engages a complementary cam (not shown) disposed inside the base 110 when the latch bar 160 is depressed for sealing the lid 120 into the closed position. A control panel 122 is disposed directly adjacent to the lid 120 on the top of the base 110. The control panel 122 includes a circuit board CB disposed directly beneath the control panel 122. A vacuum motor assembly VMA is disposed in the base 110 behind the lower vacuum trough 180 for providing evacuating suction. A transformer T is also disposed in the base 110 behind the lower vacuum trough 180 for providing electrical power to the electronic control panel 122 and the vacuum motor assembly VMA. A bumper 187 is provided on the front lower side of the lid 120 which mates against the heat sealing strips 190, 192 when lid 120 is in the closed position to sandwich the open end O of the container in the appliance 100 for evacuating and heat sealing the container C'.

Figure 5:
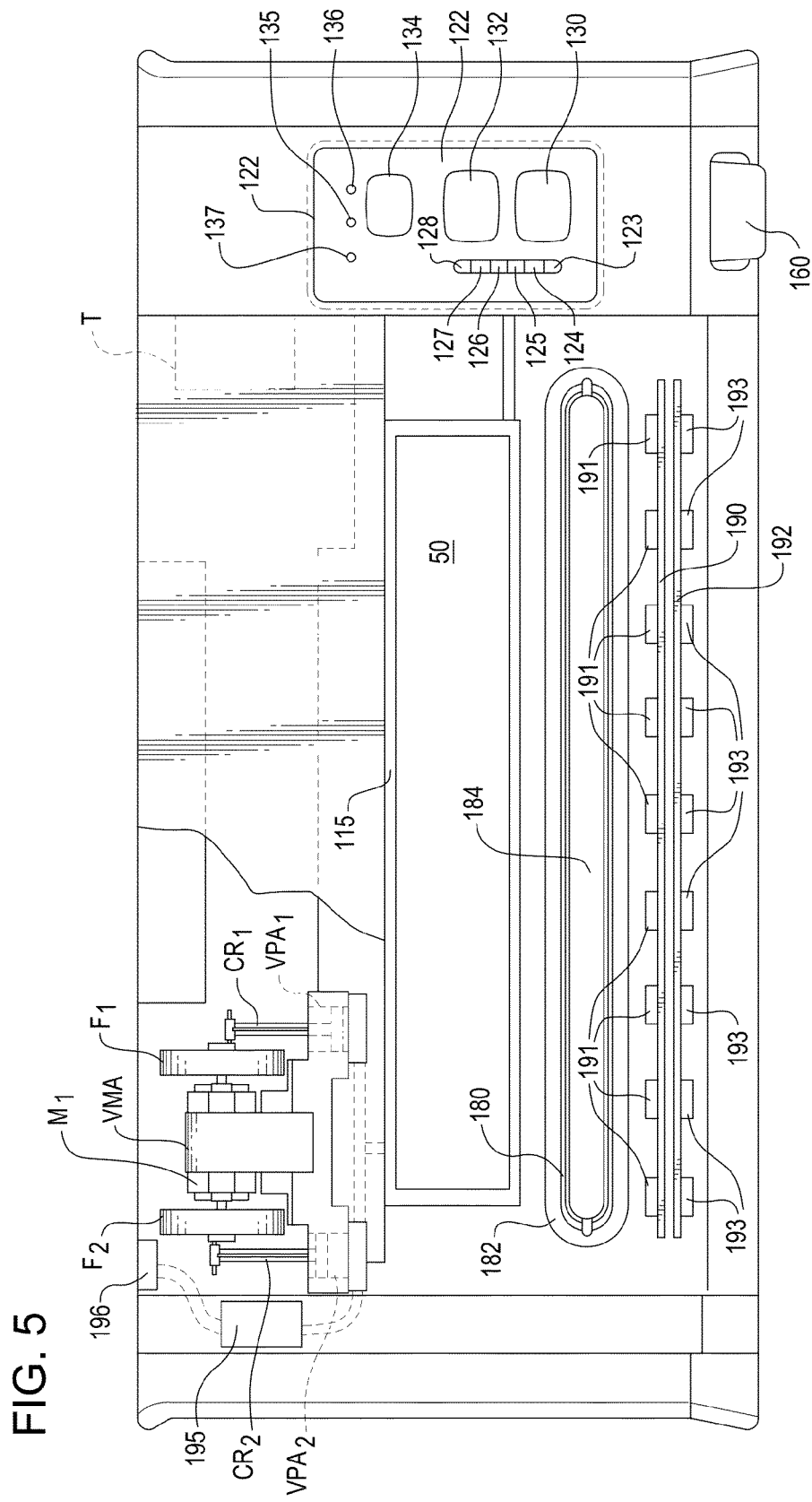
FIG. 5 is a top view of the vacuum packaging and sealing appliance of FIG. 4 with the lid removed and a portion of the base cutaway.
Figure 6:
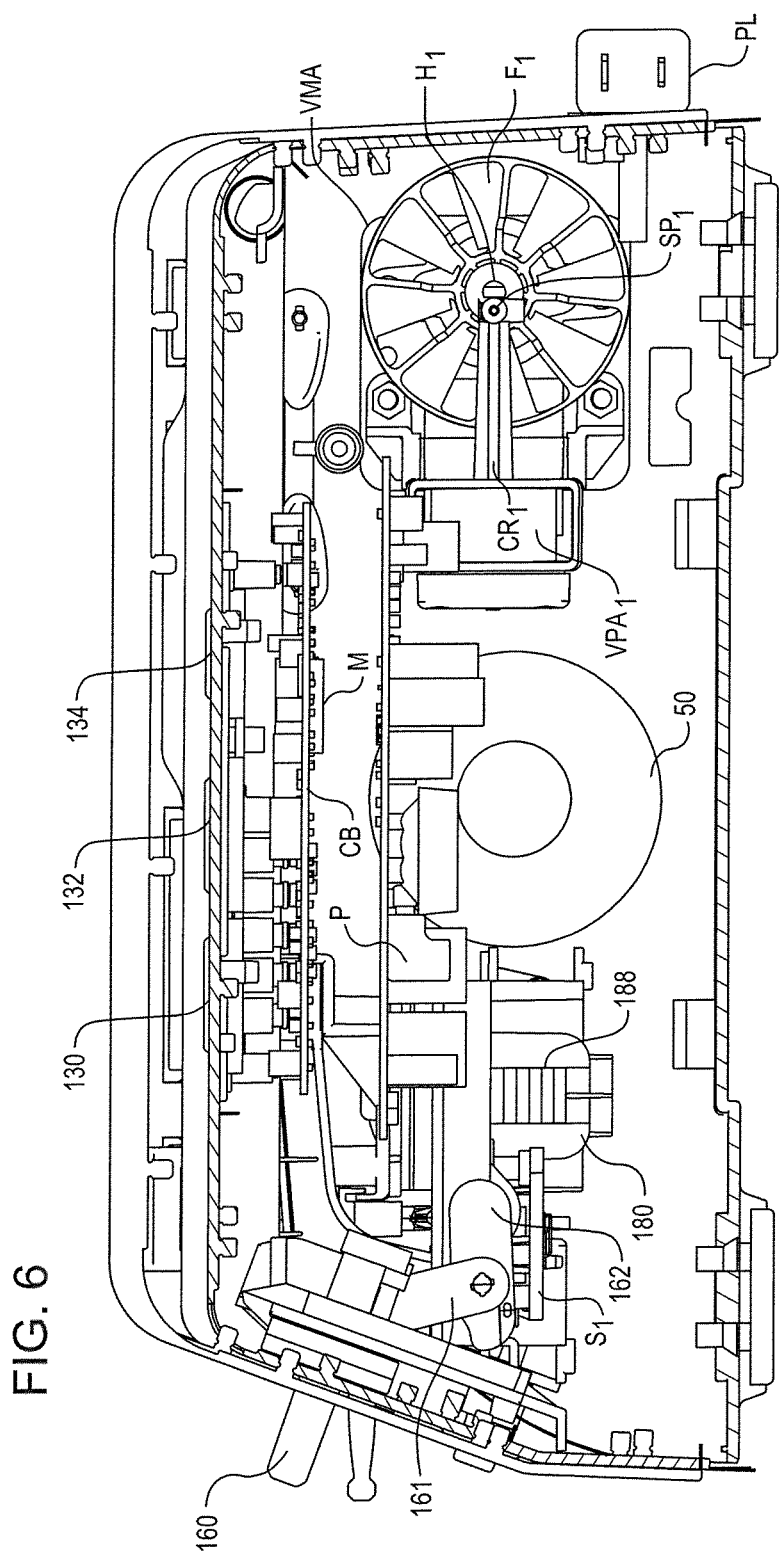
FIG. 6 is a cross-section of the vacuum packaging and sealing appliance of FIG. 3.

Referring now also to FIGS. 5 and 6, the foregoing vacuum and/or heat sealing operations are controlled by the user through the use of the electronic control panel 122. The electronic control 122 panel may include electronic switches 130, 132 and 134. The control panel 122 is electrically coupled to the vacuum motor assembly VMA, the circuit board CB, the heat sealing elements 190, 192 and the transformer T, whereby operation of these components are controlled by a microprocessor M on the circuit board CB. Heat sealing elements 190, 192 may have one or more temperature sensors 191, 193, respectively, disposed along their elongated length for measuring the temperature of heat seat elements 190, 192. This is to ensure that the proper sealing temperature is being applied along the entire width of the bag during heat sealing. The output of temperature sensors 191, 192 may be input to microprocessor M which may further determine a mean average temperature of heat sealing elements 190, 192 and adjust current output to heat sealing elements 190, 192 accordingly. Optionally, temperature sensors 191, 192 may be integrated into bumper 187 (FIG. 4) that presses on top of the bag material and heating sealing elements 190, 192 when lid 120 is in the closed position. The electronic control panel 122 is inoperative unless the lid 120 is closed and the latch bar 160 is in the latched position. A microswitch $SW_1$ is depressed when the latch bar 160 is moved to the closed position to signal the microprocessor M to energize the control panel 122.

The control panel 122 can also include other conventional components such as a power circuit (not shown), an input interface circuit (not shown), an output interface circuit (not shown), and one or more storage devices (not shown), such as a ROM (Read Only Memory) device and a RAM (Random Access Memory) device. The power circuit is connected to an AC or DC power source and directs power to the motors, sensors, etc. described herein, as well as provide power to other circuits and components of the control panel 122. The input interface circuit can be electrically connected to the electronic switches 130, 132 and 134 for user control. The output interface circuit can be electrically connected to a display (not shown), for example. The storage device stores processing results and control programs that are run by the microprocessor M. It will be apparent to those skilled in the art from this disclosure that the precise structure and algorithms for the electronic control panel 122 can be any combination of hardware and software that will carry out the functions of the present invention.

In an embodiment, the electronic switch 132 may be depressed for commencing a sealing only operation on one of the open ends of the section of container material. In this regard, it may be desirable to commence a sealing only operation on one of two open ends of the section of container material after dispensing from the roll 50. A related indicia 128 may be energized by the microprocessor M to indicate that the sealing operation has commenced. In addition, the microprocessor M energizes the heat sealing elements 190, 192 for a predetermined time at a predetermined temperature to form a seal $S_2$ on the open end of the section of container C'. The seal $S_2$ along with the pre-sealed edges $S_1$ and $S_3$ form the partially formed container C'. The partially formed container C' may be removed from the appliance 100 after the latch bar 160 is moved to the unlatched position and the lid 120 is raised. Food items A may now be placed inside the partially formed container C' which may be processed further by evacuating and/or sealing the remaining open end O as described below. In an embodiment, the indicia 128 may be a light emitting diode or other light source which is lighted during the sealing operation and may be the color red. The indicia 128 is extinguished after the predetermined sealing time has passed or after the predetermined sealing time and a dwell time for cooling has passed.

Alternately, a container C' such as that illustrated in FIG. 2 that is pre-sealed on three edges at the factory with seals $S_1$, $S_2$ and $S_3$ may be sealed on the remaining open end O by inserting the open end O into the appliance 100 and depressing the electronic switch 132 for the sealing only operation.

In another embodiment, the electronic switch 130 may be depressed for commencing a vacuum and sealing operation on the remaining open end O of the partially formed container C'. Upon depressing the switch 130, the vacuum motor assembly VMA is energized which delivers suction to the vacuum chamber by tubing (not shown) connected to the upper vacuum trough 185. Once a predetermined pressure is reached in the vacuum chamber as measured by a pressure transducer P on the circuit board CB, the first heating element 192 is energized at a first predetermined temperature for a first predetermined time to form the first seal $SL_1$. The vacuum motor assembly VMA remains energized for an additional third predetermined time after the first predetermined sealing time has elapsed. This is to allow suction from the vacuum chamber to remove any additional food or moisture between the two layers of film between the first seal $SL_1$ and the open end O of the container C' that may cause have caused poor seal quality when first seal $SL_1$ was formed. In addition, the second seal $SL_2$ may now be formed between first seal $SL_1$ and the open end O of the container C'. After the third predetermined time has elapsed, the microprocessor M de-energizes the vacuum motor assembly VMA. The microprocessor M then waits a dwell time before energizing the second heat sealing element 190 for a second predetermined time at a second predetermined temperature to form the second seal $SL_2$. The second seal $SL_2$ is a higher quality seal since any food or moisture remaining between the two layers of film between the first seal $SL_1$ and the open end O of the container C' has been removed. The microprocessor M de-energizes the second heat sealing element 190 after the second predetermined time has elapsed and also extinguishes the indicia 128.

The values of the first, second and third predetermined times, the predetermined dwell time, the predetermined vacuum pressure, and the first and second predetermined sealing temperatures were determined based upon experimentation for different types of container material. In an embodiment, the values of the first, second and third predetermined times are in a range between zero (0) and ten (10) seconds. The values of the first and second predetermined sealing temperatures are in a range of between 160° C.-200° C. All of the foregoing predetermined values may be pre-programmed into the microprocessor M, stored in look-up tables, or stored in other forms of digital storage media described above. The foregoing values may be hard coded or may be programmable with new values as newer container materials and predetermined heat sealing times, temperatures, pressures and dwell times are developed.

In an embodiment, after the electronic switch 130 is depressed for commencing the vacuum and sealing operation, a plurality of indicia 123-127 comprising green lights that progressively are lighted starting with indicia 123 being lighted when the evacuating and sealing operation has commenced with the remaining indicia 124-127 being lighted as the evacuating and sealing operations progresses. Further, initially as the evacuating and sealing operation commences the lower most indicia 123 may be lighted green, followed after a predetermined time interval by the next vertically positioned indicia 124 being lighted, followed by the next vertically positioned indicia 125 after the predetermined time interval, etc, until the remaining indicia 126 and 127 are lighted which represents the end of the evacuation cycle. After the sealing operations have finished, all of the plurality of indicia 123-127 and indicia 128 are extinguished and the sealed container C' may be removed from the appliance 100.

In an embodiment, the time interval between lighting of each of the plurality of indicia 123-127 is twenty percent (20%) of the evacuating and/or sealing operating cycle but this is not meant to be limiting as any number of indicia may be used and any increment between lighting of the indicia 123-127 may be used.

In an embodiment, an electronic switch 134 is provided to select a "dual seal" cycle as described above, or alternately, a "repetitive seal" cycle as described below. The electronic switch 134 is electronically connected to the microprocessor M which controls the operation of the "dual seal" and "repetitive seal" cycles. An indicia 135 is lighted when the "repetitive seal" cycle is selected and the indicia 136 is lighted when the "dual seal" cycle is selected. In particular, when the "repetitive seal" cycle is selected, upon depressing the electronic switch 132 for a sealing only operation or electronic switch 130 for a sealing and evacuating operation on the container C', the microprocessor M determines the current temperature of the heat sealing elements 190, 192 through temperature sensors 191, 193, respectively (FIG. 5).

The microprocessor M is programmed to determine whether the first heat sealing element 192 is at or below a threshold temperature such as fifty degrees (50°) Celsius before energizing the heat sealing element 192. If the first heat sealing element 192 is below fifty degrees (50°) Celsius, the microprocessor M energizes the first heat sealing element 192 for a predetermined time at a predetermined temperature to form the seal $SL_1$. If the first heat sealing element 192 is not below fifty degrees (50°) Celsius, the microprocessor M determines whether the second heat sealing element 190 is below fifty degrees (50°) Celsius. If so, the second heat sealing element 190 is energized for a predetermined time at a predetermined temperature to form the seal $SL_2$. If neither of the heat sealing elements 190, 192 are below fifty degrees (50°) Celsius, then the microprocessor M waits until one of the heat sealing elements 190, 192 is below fifty degrees (50°) Celsius until energizing that particular heat sealing element 190 or 192 for the respective predetermined time and at the predetermined temperature to form seal $SL_1$ or $SL_2$. This cycle is repeated each time the electronic switch is depressed so that the heating elements 190, 192 do not overheat when heat sealing multiple containers C' in succession.

In an embodiment, the lower vacuum trough 180 may include the removable drip tray 184 inserted therein for collecting excess liquids evacuated from the container C'. The drip tray 184 containing excess liquid evacuated from the container C' may be removed and the excess liquid discarded. Ears on either end of the drip tray 184 are provided for grasping and removing the drip tray 184. A liquid level sensor 188 may be disposed proximate to drip tray 184 for detecting an accumulation of liquids. For example, the liquid level sensor 188 may be disposed at one or both ends of drip tray 184. The output of the liquid level sensor 188 is provided to microprocessor M which may temporarily disable vacuum motor assembly VMA and heat sealing elements 190, 192 when drip tray 184 is full of liquid and exceeds a predetermined amount. Microprocessor M may also flash a "Check Tray" lighted indicia 137 disposed on control panel 122. After drip tray 184 is emptied and replaced, lighted indicia 137 is extinguished and vacuum and sealing operations may then resume until the container C' is evacuated and sealed. A similar drip tray is described and claimed in U.S. Pat. Nos. 7,003,928 and 7,076,929, both of which owned by Jarden Consumer Solutions of Boca Raton, Fla. and are incorporated by reference as if fully rewritten herein. A similar liquid level sensor is described in U.S. patent application serial no. 2005/0039420, which is owned by Jarden Consumer Solutions of Boca Raton, Fla., and incorporated by reference as if fully rewritten herein. This completes the vacuum and sealing operational cycle of the food preservation container C'.

Referring now particularly to FIG. 6, a partially cutaway view of the interior of the housing 110 of the vacuum sealing appliance 100 is provided illustrating the vacuum motor assembly VMA, circuit board CB with microprocessor M and pressure transducer P, and a transformer T for providing all of the necessary electrical power to these electrical components at a desired voltage. The transformer T receives the electrical power from an electrical power source such as 120 vac through an electrical power cord (not shown) connected to a plug PL. In embodiment, vacuum motor assembly VMA includes dual turbine fans $F_1$, $F_2$ for improved cooling efficiency. The dual turbine fans $F_1$, $F_2$ are disposed on opposite sides of an electrical motor $M_1$ and are rotated therewith. A spindle $SP_1$ on the hub $H_1$ of each of the dual turbine fans $F_1$, $F_2$ (only $F_1$ is illustrated in FIG. 6) is connected to crank arms $CR_1$, $CR_2$ of vacuum pump assemblies $VPA_1$, $VPA_2$, respectively. The reciprocating motion of the crank arms $CR_1$, $CR_2$ drive a diaphragm (not shown) in each of the vacuum pump assemblies $VPA_1$, $VPA_2$ for generating suction provided to the upper vacuum trough 185 and the suction port 112 via tubing (not shown) when the motor $M_1$ is energized. The use of the single motor M1 to rotate the dual turbine fans $F_1$, $F_2$ and drive the the crank aims $CR_1$, $CR_2$ of the vacuum pump assemblies $VPA_1$, $VPA_2$ eliminate the need for multiple electrical motors for powering the vacuum pump, cooling fan(s) and separate transformers for providing electrical power. As such, only the single transformer T is required reducing power consumption, complexity and the additional cost of multiple transformers.

The exact arrangement of the electronic control panel 122 and the circuit board CB, the vacuum motor assembly VMA, the pressure transducer P and microprocessor M, and the transformer T is exemplary and is not meant to be limiting in any sense. In the exemplary embodiment illustrated, the vacuum motor assembly VMA is positioned in the left side of the housing 110 behind the lower vacuum chamber 180. In an embodiment, the vacuum motor assembly VMA is fluidly connected to the upper vacuum chamber 185 via tubing (not shown) for providing evacuating suction. In another embodiment, the vacuum motor assembly VMA is fluidly connected to the lower vacuum trough 180 via tubing (not shown) for providing evacuating suction.

The circuit board CB is disposed in the housing 110 beneath the electronic control panel 122. The pressure transducer P and microprocessor M are positioned on the circuit board CB. The pressure transducer P is fluidly connected to the vacuum motor assembly VMA via tubing (not shown). A valve V may also be connected to the tubing (not shown) interconnecting the vacuum motor assembly VMA, the pressure transducer P and the composite vacuum chamber (upper vacuum trough 185 and lower vacuum trough 180) which is opened when the latch bar 160 is moved to the unlatched position to vent the vacuum chamber to ambient pressure so that the container C' may be removed from the appliance 100. The latch bar 160 is mechanically connected to a linkage 161 which is mechanically connected to an offset control rod 162 which is rotated when the latch bar 160 is moved between the latched and unlatched positions. The control rod 162 has a pair of spaced apart cams (not shown) which engage the hooks of the latches 154 when the latch bar 160 is moved the closed position to seal the lid 120 in the closed position. The switch $SW_1$ is likewise depressed when the latch bar 160 is moved to the closed position which sends a control signal to the microprocessor M to energize the electronic control panel 122. Oppositely, when the latch bar 160 is moved to the unlatched position the control rod 162 is rotated and the cams (not shown) release the hooks of the latches 154 so that the lid 120 is no longer sealed closed. The switch $SW_1$ is released such that a control signal is sent to the microprocessor M to de-energize the electronic control panel 122.

Figure 7:
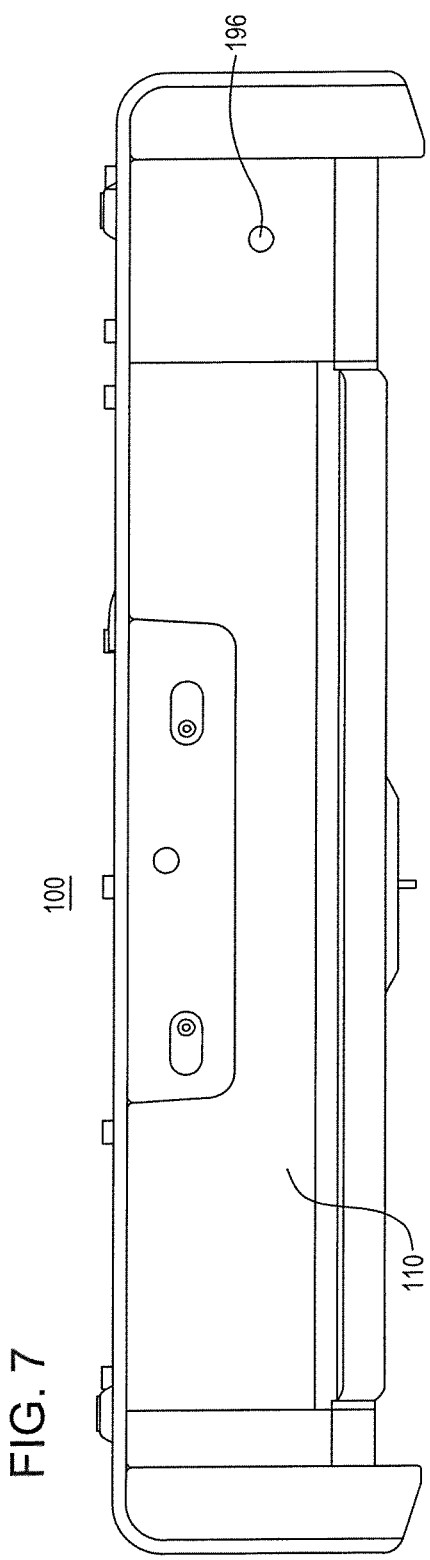
FIG. 7 is a rear view of the vacuum packaging and sealing appliance of FIG. 3.

In an embodiment, a humidity or other moisture sensor 195 is connected via tubing to the exhaust ports of $VPA_1$ and $VPA_2$ of vacuum motor assembly VMA. The humidity sensor 195 is further electrically connected to the microprocessor M. The humidity sensor 195 is fluidly connected to an exhaust port 196 on the rear of housing 110 (best seen in FIG. 7) via tubing for exhausting air and moisture to the atmosphere. Based on variable input from the humidity sensor 195 detecting moisture content in the exhaust of $VPA_1$ and $VPA_2$ of vacuum motor assembly VMA, microprocessor M may slow the rate of vacuum being applied to lower vacuum chamber 186 and/or upper vacuum chamber 185. This may be desirable to reduce the amount of liquids being drawn into lower vacuum trough 186/drip tray 184 so that it doesn't overflow. In addition, upon humidity sensor 195 detecting moisture in the exhaust of $VPA_1$ and $VPA_2$ of vacuum motor assembly VMA the amount of time heat sealing elements 180, 182 are energized may be extended proportionally by microprocessor M and respective sealing temperatures adjusted to ensure a good seal on container C' which might otherwise be inhibited by the liquid being drawn through the seal area.

Referring again particularly to FIG. 1, in an embodiment the accessory port 112 is disposed on the exterior front of the base 110 and is provided for connecting an accessory hose (not shown) for evacuating a separate non-flexible container (not shown) such as a polypropylene or other canister containing a food item to be preserved. A connector (not shown) on one end of the accessory hose (not shown) connects to the accessory port 112. Another connector (not shown) on the opposite end of the accessory hose (not shown) connects to an adapter (not shown) that is fitted to an inlet on the container (not shown). The accessory hose (not shown) and connectors (not shown) fluidly connect the non-flexible container (not shown) to the vacuum motor assembly VMA disposed in the base 110 which provides the necessary suction to evacuate the non-flexible container (not shown). The accessory port 112 may include a ball-valve that closes when the connector (not shown) is not connected to prevent loss of suction. A similar vacuum sealing appliance with an accessory port with an accessory hose and connectors for evacuating a non-flexible container is disclosed in U.S. patent application Ser. No. 13/445,605 filed on Apr. 12, 2012, owned by a common assignee, and is hereby incorporated be referenced as if fully re-written herein.

The vacuum motor assembly VMA is energized for providing the necessary suction to evacuate the canister (not shown) via the electronic switch 130 controlled by the electronic control panel 122. The accessory hose (not shown), connectors (not shown), and adapter (not shown) may be stored in a designated portion of the base 110 when not in use and may be accessed when the lid 120 is in the open position shown in FIG. 2. A pair of clips (not shown) may be provided on the underside of lid 120 for securably storing these items.

With the latch bar 160 in the latched position, the electronic control 130 may be depressed to activate the vacuum motor assembly VMA which provides suction to the accessory port 112 which is applied to the container (not shown) through the accessory hose (not shown). After a predetermined pressure is achieved in the vacuum tubing connecting the accessory port 112 to the vacuum motor assembly VMA, the pressure transducer P signals the microprocessor M to de-energize the vacuum motor assembly so that the container (not shown) may be disconnected from the accessory hose (not shown) and sealed.

In an embodiment, there is provided a method 500 of vacuum packaging and sealing a container C' using an appliance 100 as described above and illustrated in the corresponding FIGS. 1-6.

The method begins in step 505.

The method continues in step 510 including using a microprocessor to control a vacuum motor and first and second heating elements in programmable sequences.

In step 520, the method includes at least one of the programmable sequences includes energizing the vacuum motor to provide suction to the vacuum trough.

In step 530, the method includes the step 530 of energizing the second sealing element at a first predetermined temperature for a first predetermined time when a first predetermined vacuum level is reached in the vacuum trough.

In step 540, the method includes the step 540 of de-energizing the vacuum motor after a second predetermined time has elapsed after the second sealing element has been de-energized.

In step 550, the method includes the step 550 of delaying a dwell time.

In step 560, the method includes the step 560 of energizing the first sealing element at the expiration of the dwell time at a second predetermined temperature for a third predetermined time.

In step 570, the method 500 ends.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:
1. A vacuum sealing appliance, comprising:
a vacuum motor assembly generating suction;
a vacuum trough fluidly connected to the vacuum motor assembly configured to receive suction and evacuate a food container through an open end;
at least one heat sealing element adjacent the vacuum trough configured to heat seal the open end of the food container after evacuation;
a control unit configured to control the vacuum motor assembly and the at least one heat sealing element; and
a sensor connected to exhaust tubing of the vacuum motor assembly and electrically connected to the control unit, the sensor configured to detect moisture in exhaust air of the vacuum motor assembly and send electrical signals to the control unit, the control unit controlling one or both of the vacuum motor assembly and the at least one heat sealing element based upon the electrical signals;

wherein the sensor generates the electrical signal when moisture is detected in exhaust air of the vacuum motor assembly, which is indicative of liquid being drawn out of the container during evacuation, to cause the control unit to increase heat seal time of the at least one heat sealing element to compensate for liquid in a seal area of the food container caused by evacuation.

2. The vacuum sealing appliance of claim 1, comprising: a pressure transducer electrically connected to the control unit configured to detect pressure in the vacuum trough when the vacuum motor assembly is energized and generate a corresponding electrical signal to the control unit for controlling the vacuum motor assembly.

3. The vacuum sealing appliance of claim 1, wherein the control unit includes a microprocessor.

4. The vacuum sealing appliance of claim 1, wherein the sensor is a moisture or humidity sensor.

5. The vacuum sealing appliance of claim 1, wherein the sensor generates the electrical signal when moisture is detected in exhaust air of the vacuum motor assembly, which is indicative of liquid being drawn out of the container during evacuation, to cause the control unit to slow rate of suction applied to the vacuum trough by the vacuum motor assembly to reduce amount of liquid being drawn out of the food container.

6. The vacuum sealing appliance of claim 1, further including a removable drip tray disposed in the vacuum trough and a liquid level sensor disposed proximate to the removable drip tray configured to measure liquid level in the removable drip tray and generate another electrical signal provided to the control unit to control the vacuum motor assembly or the at least one heat sealing element.

7. The vacuum sealing appliance of claim 6, wherein the control units shuts off the vacuum motor assembly or the at least one heat sealing element when the liquid level sensor detects a predetermined amount of liquid in the removable drip tray.

8. The vacuum sealing appliance of claim 6, further including a lighted indicia when the liquid level sensor detects a predetermined amount of liquid in the removable drip tray.

9. The vacuum sealing appliance of claim 1, further including an exhaust port fluidly connected to the sensor and disposed on a housing of the vacuum sealing appliance to vent the A exhaust air from the vacuum motor assembly.

10. A vacuum packaging device for evacuating and sealing one or more open ends of a flexible container for storing perishable items, comprising:

a vacuum motor assembly generating suction;

a vacuum trough fluidly connected to the vacuum motor assembly configured to receive suction and evacuate the flexible container through one of the open ends;

at least one heat sealing element adjacent the vacuum trough configured to heat seal one of the open ends of the food container after evacuation;

a processor configured to control the vacuum motor assembly and the at least one heat sealing element; and a humidity sensor connected to exhaust tubing of the vacuum motor assembly and electrically connected to the processor, said humidity sensor configured to detect humidity in exhaust air of the vacuum motor assembly and send electrical signals to processor, said processor controlling one or both of the vacuum motor assembly and said at least one heat sealing element based upon said electrical signals;

wherein the humidity sensor generates the electrical signal when humidity is detected in exhaust air of the vacuum motor assembly, which is indicative of liquid being drawn out of the flexible container during evacuation, to cause the processor to increase heat seal time of the at least one heat sealing element to compensate for excess liquid in a seal area of the flexible container caused by evacuation.

11. The vacuum packaging device of claim 10, comprising:

a pressure transducer electrically connected to the processor configured to detect pressure in the vacuum trough when the vacuum motor assembly is energized and generate a corresponding electrical signal to the processor for controlling the vacuum motor assembly.

12. The vacuum packaging device of claim 10, wherein the humidity sensor generates the electrical signal when humidity is detected in exhaust air of the vacuum motor assembly, which is indicative of liquid being drawn out of the flexible container during evacuation, to cause the processor to slow rate of suction applied to the vacuum trough by the vacuum motor assembly to reduce amount of liquid being drawn out of the flexible container.

13. The vacuum packaging device of claim 10, further including a removable drip tray disposed in the vacuum trough and a liquid level sensor disposed proximate to the removable drip tray configured to measure liquid level in the vacuum trough and generate another electrical signal provided to the processor to control the vacuum motor assembly.

14. The vacuum packaging device of claim 13, wherein the control unit shuts off the vacuum motor assembly or the at least one heat sealing element when the liquid level sensor detects a predetermined amount of liquid in the removable drip tray.

15. The vacuum packaging device of claim 13, further including a lighted indicia which is lighted when the liquid level sensor detects a predetermined amount of liquid in the removable drip tray.

16. The vacuum packaging device of claim 10, further including an exhaust port fluidly connected to the humidity sensor and disposed on a housing of the vacuum packaging device to vent exhaust air from the vacuum motor assembly.

17. A vacuum sealing appliance, comprising:

a vacuum motor assembly generating suction;

a vacuum trough fluidly connected to the vacuum motor assembly configured to receive suction and evacuate a food container through an open end;

at least one heat sealing element adjacent the vacuum trough configured to heat seal the open end of the food container after evacuation;

a control unit configured to control the vacuum motor assembly and the at least one heat sealing element; and a sensor electrically connected to the control unit configured to detect moisture in exhaust air of the vacuum motor assembly and send electrical signals to the control unit, said control unit controlling one or both of the vacuum motor assembly and said at least one heat sealing element based upon said electrical signals;

wherein the sensor generates the electrical signal when moisture is detected in exhaust air of the vacuum motor assembly, which is indicative of liquid being drawn out of the container during evacuation, to cause the control unit to increase heat seal time of the at least one heat sealing element to compensate for liquid in a seal area of said food container caused by evacuation.

* * * * *